United States Patent [19]

Hormadaly

[11] Patent Number: 4,961,999
[45] Date of Patent: Oct. 9, 1990

[54] THERMISTOR COMPOSITION

[75] Inventor: Jacob Hormadaly, Wilmington, Del.

[73] Assignee: E. I. Du Pont de Nemours and Company, Wilmington, Del.

[21] Appl. No.: 388,951

[22] Filed: Sep. 5, 1989

Related U.S. Application Data

[62] Division of Ser. No. 222,495, Jul. 21, 1988, Pat. No. 4,906,406.

[51] Int. Cl.$^5$ ............................ B32B 9/00; H01B 1/08
[52] U.S. Cl. ................................ 428/427; 428/210;
428/426; 428/428; 428/704; 428/699; 428/702;
428/901; 427/376.2; 252/518; 252/519;
252/521; 501/32; 501/73; 501/75; 501/76;
501/77; 501/79; 106/1.24; 106/1.28
[58] Field of Search .............. 428/210, 426, 427, 428,
428/699, 702, 704, 901; 427/376.2; 106/1.24,
128; 252/518, 519, 521; 501/32, 73, 75, 76, 77, 79

[56] References Cited

U.S. PATENT DOCUMENTS

| | | | |
|---|---|---|---|
| 3,583,931 | 6/1971 | Bouchard | 252/520 |
| 3,775,347 | 11/1973 | Bouchard | 252/521 |
| 3,960,778 | 6/1976 | Bouchard et al. | 252/579 |
| 4,124,539 | 11/1978 | Horowitz et al. | 252/518 |
| 4,129,525 | 12/1978 | Horowitz et al. | 252/518 |
| 4,146,458 | 3/1979 | Horowitz et al. | 204/277 |
| 4,163,706 | 8/1979 | Horowitz et al. | 204/242 |
| 4,176,094 | 11/1979 | Horowitz et al. | 252/518 |
| 4,192,780 | 3/1980 | Horowitz et al. | 252/518 |
| 4,203,871 | 5/1980 | Horowitz et al. | 252/518 |
| 4,225,469 | 9/1980 | Horowitz et al. | 252/518 |
| 4,302,362 | 11/1981 | Hoffman et al. | 501/154 |
| 4,318,830 | 3/1982 | Horowitz | 252/519 |
| 4,362,656 | 12/1982 | Hormadaly | 252/518 |
| 4,436,829 | 3/1984 | Howell | 501/32 |
| 4,476,039 | 10/1984 | Hormadaly | 252/518 |
| 4,536,328 | 8/1985 | Hankey | 252/519 |
| 4,536,329 | 8/1985 | Hormadaly | 252/518 |
| 4,537,703 | 8/1985 | Hormadaly | 252/518 |
| 4,539,223 | 9/1985 | Hormadaly | 427/102 |
| 4,548,742 | 10/1985 | Hormadaly | 252/519 |

OTHER PUBLICATIONS

*Thermistors* by E. D. Macklen, Electrochemical Publications Limited, 1979, pp. V, VII, VIII, 1–3.

*Primary Examiner*—Mark L. Bell
*Assistant Examiner*—Anthony J. Green

[57] ABSTRACT

The invention is directed to a thick film thermistor composition consisting of finely divided particles of (a) a ruthenium-based pyrochlore, and (b) a short borosilicate glass or glass mixture, both dispersed in (c) an organic medium.

2 Claims, No Drawings

THERMISTOR COMPOSITION

This is a division of application Ser. No. 07/222,495, filed Jul. 21, 1988 U.S. Pat. No. 4,906,406.

FIELD OF INVENTION

The invention is directed to thick film thermistor compositions.

BACKGROUND OF THE INVENTION

The term "thermistor" is the generic name for devices made from materials the electrical conductivity of which is highly sensitive to variations in temperature. While thermistors are widely used as temperature sensors in a wide variety of industrial and consumer applications, they are particularly useful as elements of electric and electronic circuits. Thermistors having positive temperature coefficients (PTC thermistors) as well as thermistors having negative temperature coefficients (NTC thermistors) are used. Previously, thermistors having a high positive temperature coefficient of resistance (TCR) have been available, but the resistance range of those materials has been limited. Thus, the design flexibility of highly positive thermistors has been limited also. For example, doped $BaTiO_3$ has a high positive TCR, but the useful range of temperatures is only between room temperature and 100° C. Metals have a highly positive TCR but are limited in their usefulness by their low resistivity. On the other hand, silicon crystals, which do have both a highly positive TCR and a wide temperature range, can't be screen printed and therefore are limited in their usefulness also. In addition, $RuO_2$ and $RuO_2$ derivatives are known to have a good temperature range, but heretofore have had only small positive TCR values.

SUMMARY OF THE INVENTION

Therefore, the invention in its primary aspect is directed to thick film thermistor compositions based on ruthenium-based pyrochlores which produce fired thermistors which have high positive TCR values over a wide temperature range. In particular, the invention is directed to a thick film composition comprising an admixture of finely divided particles of (a) 5-60% wt. of a ruthenium-based pyrochlore; (b) 95-40% wt. of a borosilicate glass or mixture of glasses containing by mole %, basis total glass, (1) 65-85% glass-forming oxides containing 25-55% $B_2O_3$, 40-10% $SiO_2$ and 30- 0% other glass-forming oxides selected from $Al_2O_3$, $Bi_2O_3$, $ZrO_2$ and mixtures thereof, and (2) 35-15% glass-modifying oxides consisting essentially of 3-35% alkaline earth metal oxide(s) of which no more than about 10% is MgO and 0-28% replacement oxide(s) selected from $Cu2O$, PbO, ZnO and mixtures thereof, of which none exceeds 10% and the total of which does not exceed 80% of the total glass modifying oxides, the viscosity of the glass upon firing at a peak temperature of 700°-1000° C. being from 10 to 10,000 poises, both of components (a) and (b) being dispersed in (c) an organic medium.

DETAILED DESCRIPTION OF THE INVENTION

A. Ruthenium-Based Pyrochlore

The invention is directed to thermistors in which the principal conductive phase is ruthenium pyrochlore-based. At the present state of the art, this is known to include ruthenium compounds corresponding to the formula $(M_cBi_{2-c})M'_dRu_{2-d}O_{7-e}$, wherein M is at least one of the group consisting of yttrium, thallium, indium, cadmium, lead and the rare earth metals of atomic number 57-71 inclusive;

M' is at least one of platinum, titanium, chromium, rhodium and antimony;

c is a number in the range 0 to 2;

d is a number in the range 0 to about 0.5, provided that d is a number in the range 0 to 1 when M' is rhodium or more than one of platinum, and titanium; and e is a number in the range 0 to 1, being at least equal to about c/2 when M is divalent lead or cadmium.

These compounds and their preparation are disclosed in U.S. Pat. No. 3,583,931 to Bouchard and also in German Patent Application OS No. 1,816,105. The metal-rich ruthenium-based pyrochlores disclosed in the following U.S. patents can also be used in the compositions of the invention: U.S. Pat. Nos. 4,124,539; 4,129,525; 4,146,458; 4,163,706; 4,176,094; 4,192,780; 4,203,871; and 4,225,469.

The particle size of the above-described active materials is not narrowly critical from the standpoint of their technical effectiveness in the invention. However, they should, of course, be of a size appropriate to the manner in which they are applied, which is usually screen printing, and to the firing conditions. Thus the metallic material should be no bigger than 10 $\mu m$ and preferably should be below about 5 $\mu m$. As a practical matter, the available particle size of the metals is as low as 0.1 $\mu m$. It is preferred that the ruthenium component have an average surface area of at least 5 $m^2/g$ and still more preferably at least 8 $m^2/g$.

Preferred ruthenium compounds include $BiPbRu_2O_{6.5}$, $Bi_{0.2}Pb_{1.8}Ru_2O_{6.1}$, $Bi_2Ru_2O_7$, and $Pb_2Ru_2O_6$.

B. Inorganic Binder

In describing the composition of inorganic binders herein, all component proportions are given in mole percentages unless expressly indicated otherwise.

The inorganic binder component of the invention is a "short" borosilicate glass which when the composition in which it is used is fired at 700°-1000° C., exhibits a viscosity of 10 to 10,000 poises. Unlike so-called "long" glasses, which have higher viscosities when they are fired at relatively low temperatures, the "short" glasses, which are preferred for use in the compositions of the invention, have rather steeply downward viscosity/temperature correlations. Thus the preferred "short" glasses are more viscous at low temperatures. Thus they better facilitate more complete burnout of organics and minimize the occlusion of carbon particles which may be derived from the burnout of organics. The glasses which are effective for use in the invention can, however, be amorphous (vitreous) or crystalline (non-vitreous).

Compositionally, the glasses for use in the invention are borosilicate glasses which contain by mole % 65-85% glass-forming oxides and 35-15% glass-modifying oxides. These limits are important with respect to their performance in thermistor compositions. In particular, if less than 15% glass modifiers are used, they are insufficient to form a stable vitreous state. However, if more than about 35% glass modifiers are used, the glass is not durable enough and the TCE is likely to become excessive.

The primary glass-forming oxides are $B_2O_3$ which is used at a concentration of 25–55% of the glass and $SiO_2$ which is used at a concentration of 40 to 10% of the glass. The glass should contain at least 25% $B_2O_3$ to ensure that the viscosity of the glass during firing is not excessively high. However, if the $B_2O_3$ content is higher than about 55%, the durability of the glass is likely to be reduced to unacceptable levels.

The glass may also contain conditional glass-forming oxides up to a concentration of 30%. Such conditional glass-forming oxides include $Al_2O_3$, $Bi_2O_3$, $ZrO_2$ and mixtures thereof. While these conditional glass-forming oxides are not considered essential for all applications of the invention, it is nevertheless preferred that the glass contain at least about 10% and preferably 15% of such secondary glass-forming oxides. In particular, $Bi_2O_3$ is desirable to lower viscosity of the glass and enhance the glass firing range. On the other hand, $Al_2O_3$ is desirable not only to enhance the glass-forming range, but also improve its durability.

The primary glass modifiers for use in the glasses of the invention are the alkaline earth metal oxides which can be used in amounts up to 35% of the total glass. The alkaline earth metal oxides can be used either individually or in admixture. However, it is preferred that no more than 10% MgO be used, lest the glass tend to crystallize when it is subjected to thick film processing conditions. Up to 80% of the primary alkaline earth metal oxide glass modifiers can be substituted by secondary or substitute glass modifiers such as ZnO, PbO, $Cu_xO$ ($Cu_2O$ or CuO) or $ZrO_2$. However, the glass binder should contain no more than 15% wt. of any of these substitute glass formers, lest the viscosity of the glass at firing temperature become too high.

In addition to the glass itself, the composition of the invention can contain small amounts (up to 15% wt.) of CuO, $Cu_2O$ and/or $ZrO_2$ or precursors thereof to enhance the hot TCR of the composition.

In the practice of the invention, it has been shown by x-ray diffraction studies that the ruthenium-based pyrochlore component is essentially completely decomposed to $RuO_2$ and the other oxide components of the pyrochlore are absorbed into the glass during the firing operation. However, when $RuO_2$ is substituted for the ruthenium-based pyrochlore, the properties of the fired composition are quite different. For example, the composition of the invention when fired results in a thermistor having a highly positive TCR value, whereas a conventional $RuO_2$-based composition results in moderately negative TCR values and lower R values. Thus, even though the primary conductive component of the final compositions are the same, the electrical properties are quite different. Though the reason for this apparent anomaly is not fully understood, it is believed that the decomposition products of the pyrochlore may be interacting with the glass binder to influence these results.

The glasses are prepared by conventional glass-making techniques by mixing the desired components in the desired proportions and heating the mixture to form a melt. As is well known in the art, heating is conducted to a peak temperature and for a time such that the melt becomes entirely liquid and homogeneous. In the present work, the components are premixed by shaking in a polyethylene jar with plastic balls and then melted in a crucible at up to 1200° C., depending on the composition of the glass. The melt is heated at a peak temperature for a period of 1–3 hours. The melt is then poured into cold water. The maximum temperature of the water during quenching is kept as low as possible by increasing the volume of water to melt ratio. The crude frit after separation from water is freed from residual water by drying in air or by displacing the water by rinsing with methanol. The crude fruit is then ball-milled for 3–5 hours in alumina containers using alumina balls. Alumina picked up by the materials, if any, is not within the observable limit as measured by x-ray diffraction analysis.

After discharging the milled frit slurry from the mill, the excess solvent is removed by decantation and the frit powder is air dried at room temperature. The dried powder is then screened through a 325-mesh screen to remove any large particles.

The major two properties of the frit are: it aids the liquid phase sintering of the inorganic crystalline particulate matters and form noncrystalline (amorphous) or crystalline materials by devitrification during the heating-cooling cycle (firing cycle) in the preparation of thick film resistors. This devitrification process can yield either a single crystalline phase having the same composition as the precursor noncrystalline (glassy) material or multiple crystalline phases with different compositions from that of the precursor glassy material.

C. Organic Medium

The inorganic particles are mixed with an essentially inert liquid medium (vehicle) by mechanical mixing (e.g., on a roll mill) to form a pastelike composition having suitable consistency and rheology for screen printing. The latter is printed as a "thick film" on conventional dielectric substrates in the conventional manner.

Any inert liquid may be used as the vehicle. Various organic liquids, with or without thickening and/or stabilizing agents and/or other common additives, may be used as the vehicle. Exemplary of organic liquids which can be used are the aliphatic alcohols, esters of such alcohols, for example, acetates and propionates, terpenes such as pine oil, terpineol and the like, solutions of resins such as the polymethacrylates of lower alcohols and solutions of ethyl cellulose in solvents such as pine oil and the monobutyl ether of ethylene glycol monoacetate. A preferred vehicle is based on ethyl cellulose and beta-terpineol. The vehicle may contain volatile liquids to promote fast setting after application to the substrate.

The ratio of vehicle to solids in the dispersions can vary considerably and depends upon the manner in which the dispersion is to be applied and the kind of vehicle used. Normally to achieve good coverage, the dispersions will contain complementally 60–90% solids and 40–10% vehicle. The compositions of the present invention may, of curse, be modified by the addition of other materials which do not affect its beneficial characteristics. Such formulation is well within the skill of the art.

The pastes are conveniently prepared on a three-roll mill. The viscosity of the pastes is typically within the following ranges when measured on a Brookfield HBT viscometer at low, moderate and high shear rates:

| Shear Rate (sec$^{-1}$) | Viscosity (Pa.s) |
| --- | --- |
| 0.2 | 100–5000 |
|  | 300–2000 Preferred |
|  | 600–1500 Most Preferred |
| 4 | 40–400 |

| Shear Rate (sec$^{-1}$) | Viscosity (Pa.s) |
|---|---|
| 384 | 100-250 Preferred<br>140-200 Most Preferred<br>7-40<br>10-25 Preferred<br>12-18 Most Preferred |

The amount of vehicle utilized is determined by the final desired formulation viscosity.

FORMULATION AND APPLICATION

In the preparation of the composition of the present invention, the particulate inorganic solids are mixed with the organic carrier and dispersed with suitable equipment, such as a three-roll mill, to form a suspension, resulting in a composition for which the viscosity will be in the range of about 100-150 pascal-seconds at a shear rate of 4 sec$^{-1}$.

In the examples which follow, the formulation was carried out in the following manner:

The ingredients of the paste, minus about 5% organic components equivalent to about 5% wt., are weighed together in a container. The components are then vigorously mixed to form a uniform blend; then the blend is passed through dispersing equipment, such as a three-roll mill, to achieve a good dispersion of particles. A Hegman gauge is used to determine the state of dispersion of the particles in the paste. This instrument consists of a channel in a block of steel that is 25 μm deep (1 mil) on one end and ramps up to 0″ depth at the other end. A blade is used to draw down paste along the length of the channel. Scratches will appear in the channel where the agglomerates' diameter is greater than the channel depth. A satisfactory dispersion will give a fourth scratch point of 10-18 typically. The point at which half of the channel is uncovered with a well dispersed paste is between 3 and 8 typically. Fourth scratch measurement of >20 μm and "half-channel" measurements of >10 μm indicate a poorly dispersed suspension.

The remaining 5% consisting of organic components of the paste is then added, and the resin content is adjusted to bring the viscosity when fully formulated to between 140 and 200 Pa.s at a shear rate of 4 sec$^{-1}$. The composition is then applied to a substrate, such as alumina ceramic, usually by the process of screen printing, to a wet thickness of about 30-80 microns, preferably 35-70 microns, and most preferably 40-50 microns. The electrode compositions of this invention can be printed onto the substrates either by using an automatic printer or a hand printer in the conventional manner, preferably automatic screen stencil techniques are employed using a 200- to 325-mesh screen. The printed pattern is then dried at below 200° C., about 150° C., for about 5-15 minutes before firing. Firing to effect sintering of both the inorganic binder and the finely divided particles of metal is preferably done in a well ventilated belt conveyor furnace with a temperature profile that will allow burnout of the organic matter at about 300°-600° C., a period of maximum temperature of about 700°-1000° C. lasting about 5-15 minutes, followed by a controlled cooldown cycle to prevent over sintering, unwanted chemical reactions at intermediate temperatures or substrate fracture which can occur from too rapid cooldown. The overall firing procedure will preferably extend over a period of about 1 hour, with 20-25 minutes to reach the firing temperature, about 10 minutes at the firing temperature and about 20-25 minutes in cooldown. In some instances, total cycle times as short as 30 minutes can be used.

SAMPLE PREPARATION

Samples to be tested for Temperature Coefficient of Resistance (TCR) are prepared as follows:

A pattern of the thermistor formulation to be tested is screen printed upon each of ten coded Alsimag 614 1×1″ ceramic substrates and allowed to equilibrate at room temperature and then dried at 150° C. The mean thickness of each set of dried films before firing must be 22-28 microns as measured by a Brush Surfanalyzer. The dried and printed substrate is then fired for about 60 minutes using a cycle of heating at 35° C. per minute to 850° C., dwell at 850° C. for 9 to 10 minutes and cooled at a rate of 30° C. per minute to ambient temperature.

RESISTANCE MEASUREMENT AND CALCULATIONS

The test substrates are mounted on terminal posts within a controlled temperature chamber and electrically connected to a digital ohm-meter. The temperature in the chamber is adjusted to 25° C. and allowed to equilibrate, after which the resistance of each substrate is measured and recorded.

The temperature of the chamber is then raised to 125° C. and allowed to equilibrate, after which the resistance of the substrate is again measured and recorded.

The temperature of the chamber is then cooled to −55° C. and allowed to equilibrate and the cold resistance measured and recorded.

The hot temperature coefficient of resistance (HTCR) and cold temperature coefficient of resistance (CTCR) are calculated as follows:

$$HTCR = \frac{R_{125° C.} - R_{25° C.}}{R_{25° C.}} \times (10,000) \text{ ppm/°C.}$$

$$CTCR = \frac{R_{55° C.} - R_{25° C.}}{R_{25° C.}} \times (-12,500) \text{ ppm/°C.}$$

The values of $R_{25° C.}$ and Hot TCR are averaged and $R_{25° C.}$ values are normalized to 25 microns dry printed thickness and resistivity is reported as ohms per square at 25 microns dry print thickness. Normalization of the multiple test values is calculated with the following relationship:

$$\text{Normalized Resistance} = \frac{\text{Avg. Measured Resistance} \times \text{Avg. Dry Print Thickness, microns}}{25 \text{ microns}}$$

EXAMPLES

In the Examples which follow, all thick film compositions and inorganic binders were prepared and the final thermistors therefrom were tested in the manner described hereinabove.

In Table I, the composition of the four glasses in accordance with the invention are given.

Thus, the following Examples differ only in their composition as indicated in the Tables.

TABLE I

Preferred Glass Compositions

| Composition | Glass No. 1 | Glass No. 2 | Glass No. 3 | Glass No. 4 |
|---|---|---|---|---|
| | | (Mole %) | | |
| Glass Former | | | | |
| $Al_2O_3$ | 5.0 | — | 4.3 | 4.3 |
| $B_2O_3$ | 55.0 | 55.0 | 47.3 | 42.3 |
| $Bi_2O_3$ | — | — | — | 5.0 |
| $SiO_2$ | 15.0 | 20.0 | 17.4 | 17.4 |
| $ZrO_2$ | — | — | 4.5 | 4.5 |
| Sub-Total | 75.0 | 75.0 | 73.5 | 73.5 |
| Glass Modifier | | | | |
| BaO | 20.0 | 10.0 | 17.2 | 17.2 |
| CaO | — | — | — | — |
| MgO | 5.0 | 5.0 | 2.1 | 2.1 |
| SrO | — | 10.0 | — | — |
| Sub-Total | 25.0 | 25.0 | 19.3 | 19.3 |
| PbO | — | — | — | — |
| ZnO | — | — | 6.7 | 6.7 |
| CuO | — | — | 0.5 | 0.5 |
| Sub-Total | — | — | 7.2 | 7.2 |

TABLE II

Effect of Pyrochlore Concentration on Thermistor Electrical Properties

| | Example No. | | | | | | | |
|---|---|---|---|---|---|---|---|---|
| | 1 | 2 | 3 | 4 | 5 | 6 | 7 | 8 |
| | | | | (% Wt.) | | | | |
| Composition | | | | | | | | |
| Glass No. 1 | 60.0 | 70.0 | 80.0 | 85.0 | 90.0 | 91.0 | 96.3 | 80.0 |
| $Pb_2Ru_2O_6$ | 40.0 | 30.0 | 20.0 | 15.0 | 10.0 | 9.0 | — | 10.0 |
| $RuO_2$ | — | — | — | — | — | — | 3.7 | — |
| $ZrSiO_4$ | — | — | — | — | — | — | — | 10.0 |
| Electrical Properties | | | | | | | | |
| $R_{av}$ ($\Omega/\square$) | 55 | 218 | 1419 | 3423 | 10392 | 23502 | 210086 | 7795290 |
| $HTCR_{av}$ (ppm/°C.) | 1730 | 1242 | 700 | 536 | 376 | 288 | 22 | −105 |

Examples 1-6 illustrate the effect of increasing lead ruthenate content upon the electrical properties of the thermistors of the invention. In particular, as the concentration of lead ruthenate is raised, HTCR rises rapidly and becomes most highly positive. Examination of the fired thermistors by x-ray diffraction revealed diffraction lines only for $RuO_2$ and not $Pb_2Ru_2O_6$. Yet a comparison of Examples 3 and 7 which contain the same equivalent amount of $RuO_2$ shows that the thermistors containing added $RuO_2$ only (Example 7) had resistance values which were almost two orders of magnitude higher than those in which the $RuO_2$ was derived from the $Pb_2Ru_2O_6$ upon firing. In addition, HTCR was much lower, albeit still slightly positive, for the fired compositions containing added $RuO_2$.

A comparison of Example 8 with Example 5 shows that the addition of a zircon ($ZrSiO_4$) filler causes a very steep increase in resistance and a decrease in HTCR which becomes negative. It is believed that upon firing some of the $ZrSiO_4$ becomes dissolved in the binder glass and thus raises its viscosity.

EXAMPLES 9-12

TABLE III

Effect of Additives on Thermistor Electrical Properties

| | Example No. | | | |
|---|---|---|---|---|
| | 9 | 10 | 11 | 12 |
| | | (% Wt.) | | |
| Composition | | | | |
| Glass No. 1 | 90.0 | 80.0 | 80.0 | 76.5 |
| $Pb_2Ru_2O_6$ | 10.0 | 10.0 | 10.0 | 10.0 |
| $ZrSiO_4$ | — | 10.0 | — | 8.0 |
| ZnO | — | — | 10.0 | 4.5 |
| CuO | — | — | — | 1.0 |
| Electrical Properties | | | | |
| $R_{av}$ ($\Omega/\square$) | 10.4 | 7795.3 | 8.8 | 173.3 |
| $HTCR_{av}$ (ppm/°C.) | 376 | −105 | 240 | 318 |

Examples 9-12 (data in Table III above) all contain the same amount of pyrochlore, but part of the glass binder was substituted with a metal oxide filler (note that Example 9 is the same as Example 5 supra and Examples 10 is the same as Example 8 supra). Example 10 shows that the use of $ZrSiO_4$ raises resistance and lower TCR. Example 11 illustrates the effect of ZnO in raising resistance and somewhat lowering TCR. Example 12 shows that by using a combination of CuO and ZnO, thermistors of equivalent TCR value can be made with greatly different resistance values. The fillers also affect the firing viscosity of the composition in that $ZrSiO_4$ raises glass viscosity and ZnO lowers glass viscosity.

EXAMPLES 13-18

TABLE IV

Use of Mixed Glasses In Thermistor Compositions

| | Example No. | | | | | |
|---|---|---|---|---|---|---|
| | 13 | 14 | 15 | 16 | 17 | 18 |
| | | | (% Wt.) | | | |
| Composition | | | | | | |
| Glass No. 3 | 65.0 | 53.9 | 70.0 | 60.0 | 50.0 | 45.0 |
| Glass A[1] | 10.0 | 15.0 | 10.0 | 20.0 | 30.0 | 40.0 |
| $Pb_2Ru_2O_6$ | 20.0 | 20.0 | 20.0 | 15.0 | 15.0 | 15.0 |
| $ZrSiO_4$ | 5.0 | 7.1 | — | 5.0 | 5.0 | — |
| Electrical Properties | | | | | | |
| $R_{av}$ (k$\Omega/\square$) | 889 | 10 | 7 | 6452 | 10 | 1 |
| $HTCR_{av}$ (ppm/°C.) | 173 | 690 | 489 | [2] | 1206 | 1824 |

[1] 65% wt. PbO, 34.0% wt. $SiO_2$, 1.0% wt. $Al_2O_3$
[2] Unstable

The data in Table IV show the effect of changing the ratio of lead-free glass (Glass No. 3) to lead-containing glass (Glass A) on the thermistor properties. In particular, Examples 13 and 14 show that as the amount of PbO is raised, the resistance drops even when the concentration of filler ($ZrSiO_4$) is higher and the TCR becomes more positive as well. Examples 13 and 15 show that the use of filler raises resistance and lowers TCR values. Nevertheless, a comparison of Example 14 with Example 15 and Example 16 with Example 17 show that the use of filler does not always raise resistance and lower TCR, but that it depends on the ratio of PbO-containing glass to PbO-free glass.

A comparison of Example 16 and 17 with Example 18 shows that as the amount of PbO-containing glass is raised, resistance drops and TCR is raised.

EXAMPLES 19–26

TABLE V

Effect of Formulation Variables On Thermistor Properties

| | Example No. | | | | | | | |
|---|---|---|---|---|---|---|---|---|
| | 19 | 20 | 21 | 22 | 23 | 24 | 25 | 26 |
| | (% Wt.) | | | | | | | |
| Composition | | | | | | | | |
| Glass No. 3 | — | 85.0 | — | — | 84.2 | 94.4 | 80.0 | 70.0 |
| Glass No. 4 | 85.0 | — | 90.0 | 80.0 | — | — | — | — |
| Glass A* | — | — | — | 10.0 | — | — | — | — |
| $Pb_2Ru_2O_6$ | 15.0 | 15.0 | 10.0 | 10.0 | — | — | 20.0 | 30.0 |
| $Bi_2Ru_2O_7$ | — | — | — | — | 15.8 | — | — | — |
| $RuO_2$ | — | — | — | — | — | 5.6 | — | — |
| Electrical Properties | | | | | | | | |
| $R_{av}$ (k$\Omega$/□) | 9.3 | ** | ** | 93.9 | 9 | 81.4 | 109.7 | 57.3 | 1.3 |
| $HTCR_{av}$ (ppm/°C.) | 1305 | — | — | 1465 | 446 | −128 | 224 | 584 |

*57.5% wt. PbO, 24.5% wt. $SiO_2$, 0.8% $Al_2O_3$, 16.2% wt. $B_2O_3$, 1.0% wt. CuO.
**Too high for measurement Comparison of Examples 19 and 20 shows that the use of glass 4 in which a small amount of $Bi_2O_3$ is substituted for $B_2O_3$ reszults in a lower resistance while use of the bismuth-free glass resulted in a resistance value too high for measurement. This phenomenon is the the result of the reduced viscosity of the $Bi_2O_3$-containing glass.

Example 21 shows that the use of less pyrochlore than in Example 19 results in a resistance value too high for measurement. However, by substituting 10% of Glass A, a useful resistance value is obtained and a good TCR value is obtained also. These examples show in addition that by mixing composition, such as Example 19 and 22, a range of resistors having R values from 10 to 100 K$\Omega$/ can be obtained.

Example 23 illustrates the use of a bismuth ruthenate in place of lead ruthenate and that the two ruthenates are fully equivalent in their usefulness in the thermistor composition of the invention.

Example 24 and 25 illustrate a very subtle but important point. In particular, even though these two compositions contain the same equivalent amount of $RuO_2$, the fired thermistors do not have the same properties. Thus the presence of $RuO_2$ derived from a ruthenium-based pyrochlore is not equivalent to the use of $RuO_2$ by itself. From these data it can be seen that the glass interaction of the composition of the invention are quite important.

Examples 25 and 26, on the other hand, illustrate that raising the level of pyrochlore in the composition lowers resistance values and raises positive TCR values.

EXAMPLES 27 and 28

TABLE VI

Effect of Copper Oxide Addition On Electrical Properties of Thermistors

| | Example No. | |
|---|---|---|
| | 27 | 28 |
| | (% Wt.) | |
| Composition | | |
| Glass No. 4 | 70.0 | 65.7 |
| Glass No. B[(1)] | 10.0 | 10.0 |
| $Pb_2Ru_2O_6$ | 20.0 | 20.0 |

TABLE VI-continued

Effect of Copper Oxide Addition On Electrical Properties of Thermistors

| | Example No. | |
|---|---|---|
| | 27 | 28 |
| | (% Wt.) | |
| $Cu_2O$ | — | 4.3 |
| Electrical Properties | | |
| Rav ($\Omega$/□/mil) | 4717 | 164 |
| HTCR (ppm/°C.) | 1092 | 2735 |
| CTCR (ppm/°C.) | 1228 | 3122 |

[(1)]57.5% wt. PbO, 24.5% wt. $SiO_2$, 0.8% wt. $Al_2O_3$, 16.2% wt. $B_2O_3$ and 1.0% wt. $Cu_2O$.

The data in Table VI show that the addition of copper oxide ($Cu_2O$) to compositions containing the same relative amount of $Pb_2Ru_2O_6$ results in a substantial increase in both HTCR and CTCR and a substantial decrease in resistance.

EXAMPLES 29–31

TABLE VII

Effect of Copper Oxide and Zirconium Silicate Addition on Electrical Properties of Thermistors

| | Example No. | | |
|---|---|---|---|
| | 29 | 30 | 31 |
| | (% Wt.) | | |
| Composition | | | |
| Glass No. 4 | 50.0 | 57.9 | 62.9 |
| Glass No. B | 10.0 | 10.0 | 10.0 |
| $Pb_2Ru_2O_6$ | 22.9 | 15.0 | 10.0 |
| $Cu_2O$ | 10.0 | 10.0 | 10.0 |
| $ZrSiO_4$ | 7.1 | 7.1 | 7.1 |
| Electrical Properties | | | |
| Rav ($\Omega$/□/mil) | 57 | 231 | 5150 |
| HTCR (ppm/°C.) | 3219 | 2998 | 2379 |
| CTCR (ppm/°C.) | 2907 | 2645 | 2143 |

In comparing the data in Table VII with the data from Example 27, it can be seen that the addition of $ZrSiO_4$ gives a very sharp increase in both HTCR and CTCR and that $ZrSiO_4$ in combination with $Cu_2O$ can be used to prepare an entire family of thermistors having a wide range of electrical properties.

EXAMPLES 32-34

TABLE VIII

Use of Fillers and Glass Combinations
To Obtain a Range of Resistance Properties

|  | Example No. | | |
| --- | --- | --- | --- |
|  | 32 | 33 | 34 |
|  | (% Wt.) | | |
| Composition | | | |
| Glass No. 4 | 22.0 | 24.7 | 25.6 |
| Glass A | 26.0 | 29.3 | 30.4 |
| Glass No. B | 10.3 | 10.3 | 10.3 |
| $Pb_2Ru_2O_6$ | 17.3 | 11.3 | 9.3 |
| $Cu_2O$ | 3.0 | 3.0 | 3.0 |
| $ZrSiO_4$ | 14.3 | 14.3 | 14.3 |
| $SiO_2$ | 7.1 | 7.1 | 7.1 |
| Electrical Properties | | | |
| Rav (k$\Omega$/□/mil) | 0.9 | 10.1 | 215.9 |
| HTCR (ppm/°C.) | 2528 | 2668 | 2397 |
| CTCR (ppm/°C.) | 3092 | 3134 | 3047 |

The data in Table VIII show that thermistors having a wide range of resistance values can be made in accordance with the invention by use of glass mixtures. The use of $ZrSiO_4$ as a filler has essentially no TCR effect. Likewise the $SiO_2$ affects only the viscosity and CTE of the fired composition. The $Cu_2O$ was used to adjust both resistance and TCR levels.

I claim:

1. A thermistor comprising a layer of a composition consisting essentially of an admixture of finely divided particles of (a) 5–60% wt. of a ruthenium-based pyrochlore; (b) 95–40% wt. of a borosilicate glass or mixture of glasses containing by mole %, basis total glass, (1) 65–85% glass-forming oxides containing 25–55% $B_2O_3$, 40–10% $SiO_2$ and 30–0% other glass-forming oxides selected from $Al_2O_3$, $Bi_2O_3$, $ZrO_2$ and mixtures thereof, and (2) 35–15% glass modifying oxides consisting essentially of 3–35% alkaline earth metal oxide(s) of which no more than about 10% is MgO and 0–28% replacement oxide(s) selected from the group consisting of CuO, $Cu_2O$, PbO, ZnO and mixtures thereof, of which none exceeds 10% and the total of which does not exceed 80% of the total glass modifying oxides, the viscosity of the glass upon firing at a peak temperature of 700°–1000° C. being from 10 to 10,000 poises, both of components (a) and (b) being dispersed in (c) an organic medium, which layer has been printed upon a substrate and fired to effect volatilization of the organic medium therefrom and liquid phase sintering of the glass.

2. A method for making a thermistor comprising sequential steps of (a) applying to a substrate a thick film layer of a composition comprising an admixture of finely divided particles of (a) 5–60% wt. of a ruthenium-based pyrochlore; (b) 95–40% wt. of a borosilicate glass or mixture of glasses containing by mole %, basis total glass, (1) 65–85% glass-forming oxides containing 25–55% $B_2O_3$, 40–10% $SiO_2$ and 30–0% other glass-forming oxides selected from $Al_2O_3$, $Bi_2O_3$, $ZrO_2$ and mixtures thereof, and (2) 35–15% glass modifying oxides consisting essentially of 3–35% alkaline earth metal oxide(s) of which no more than about 10% is MgO and 0–28% replacement oxide(s) selected from CuO, $Cu_2O$, PbO, ZnO and mixtures thereof, of which none exceeds 10% and the total of which does not exceed 80% of the total glass modifying oxides, the viscosity of the glass upon firing at a peak temperature of 700°–1000° C. being from 10 to 10,000 poises, both of components (a) and (b) being dispersed in (c) an organic medium, and (b) firing the applied layer to effect volatilization of the organic medium therefrom and liquid phase sintering of the glass.

* * * * *